(12) United States Patent
Zuo et al.

(10) Patent No.: US 7,344,401 B2
(45) Date of Patent: Mar. 18, 2008

(54) SURFACE CONTACT CARD HOLDER

(75) Inventors: Zhou-Quan Zuo, Shenzhen (CN); Chia-Hua Chen, Tu-Cheng (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 0 days.

(21) Appl. No.: 11/309,593

(22) Filed: Aug. 28, 2006

(65) Prior Publication Data

US 2007/0149059 A1 Jun. 28, 2007

(30) Foreign Application Priority Data

Dec. 27, 2005 (CN) .......................... 2005 1 0121387

(51) Int. Cl.
*H01R 13/62* (2006.01)
(52) U.S. Cl. ........................... 439/326; 439/630
(58) Field of Classification Search ................ 439/630, 439/326, 341, 376, 379; 455/558, 575, 550
See application file for complete search history.

(56) References Cited

U.S. PATENT DOCUMENTS

| | | | | |
|---|---|---|---|---|
| 5,603,629 A * | 2/1997 | DeFrasne et al. | ........... | 439/331 |
| 5,933,328 A * | 8/1999 | Wallace et al. | ............. | 361/737 |
| 6,035,216 A * | 3/2000 | Cheng et al. | ................ | 455/558 |
| 6,101,372 A * | 8/2000 | Kubo | .......................... | 455/558 |
| 6,220,882 B1 * | 4/2001 | Simmel et al. | ............. | 439/326 |
| 6,424,118 B1 * | 7/2002 | Tu | .............................. | 320/115 |
| 6,561,851 B2 * | 5/2003 | Florescu | ..................... | 439/630 |
| 6,567,273 B1 * | 5/2003 | Liu et al. | .................... | 361/737 |
| 6,786,743 B2 * | 9/2004 | Huang | ......................... | 439/131 |
| 7,093,764 B1 * | 8/2006 | Valenzuela et al. | ......... | 235/486 |
| 2004/0229664 A1 * | 11/2004 | Chadha | .................. | 455/575.1 |

* cited by examiner

*Primary Examiner*—Tulsidas C. Patel
*Assistant Examiner*—Vladimir Imas
(74) *Attorney, Agent, or Firm*—Jeffrey T. Knapp

(57) ABSTRACT

A holder for holding a surface contact card (100) includes a receiving groove and a latch structure (20). The receiving groove is defined at one side of the main body (10). The latching structure rotatably engages in the receiving groove and is configured for receiving the surface contact card (30) therein.

15 Claims, 7 Drawing Sheets

SURFACE CONTACT CARD HOLDER

FIELD OF THE INVENTION

The present invention generally relates to structures for holding card members in an electronic device and, particularly, to a surface contact card holder for holding a surface contact card in a portable electronic device.

DESCRIPTION OF RELATED ART

With the development of wireless communication and information processing technologies, portable electronic devices such as mobile phones are now in widespread use. These electronic devices enable consumers to enjoy high-tech services anytime and anywhere. Surface contact cards having special circuits are widely used in portable electronic devices to enhance or specialize the functions of the portable electronic devices. For example, a subscriber identity module (SIM) card can be placed in a mobile phone to dedicate the mobile phone' functions to the SIM card owner. By changing SIM cards, a single mobile phone can be used by many different SIM card owners as a personal phone.

Referring now to FIG. 7, a typical SIM card holder is disclosed as follows. The SIM card holder includes a mounting base 80 and a locking element 90. A receiving groove 801 is defined in the mounting base 80 for receiving a SIM card. The locking element 90 includes a fixing portion 901, an operating portion 903 and a deformable portion 905. The locking element 90 is mounted on the mounting base 80. The fixing portion 901 protrudes over the receiving groove 801 to hold the SIM card. When the operating portion 903 is pulled manually, the deformable portion 905 deforms and the fixing portion 901 moves away from the receiving groove 801, thereby allowing the SIM card to be removed from the receiving groove 801 of the mounting base 80.

It can be seen that the deformable portion 905 of the locking element 90 is very large, and a height of the deformable portion 905 will increase when pulling the operating portion 903. Thus, the SIM card holder occupies a large amount of space, which results in an overly large size for electronic devices such as mobile phones. In addition, when a person is installing or removing the SIM card, he or she must hold the mobile phone and operate the locking element 90 with one hand and remove the SIM card simultaneously with another hand. That is, it is difficult for the user to operate the SIM card holder one-handed.

Therefore, there is a need for a new surface contact card holder which can hold a surface contact card steadily in a portable electronic device.

SUMMARY OF THE INVENTION

In one embodiment, a holder for holding a surface contact card includes a receiving groove and a latch structure. The receiving groove is defined at one side of a main body of an electronic device. The latch structure rotatably engages in the receiving groove and is configured for receiving the surface contact card therein.

Other advantages and novel features of the present embodiment will become more apparent from the following detailed description thereof when taken in conjunction with the accompanying drawings.

BRIEF DESCRIPTION OF THE DRAWINGS

Many aspects of the surface contact card holder can be better understood with reference to the following drawings. The components in the drawings are not necessarily drawn to scale, the emphasis instead being placed upon clearly illustrating the principles of the present surface contact card holder. Moreover, in the drawings, like reference numerals designate corresponding parts throughout the several views.

DETAILED DESCRIPTION OF THE EMBODIMENTS

The present surface contact card holder is suitable for portable electronic devices, such as mobile phones, PDAs, and so on. The surface contact card holder can be used for holding surface contact cards such as SIM cards, compact flash cards (CFs), multimedia cards (MMCs), and so on.

Figure 1:
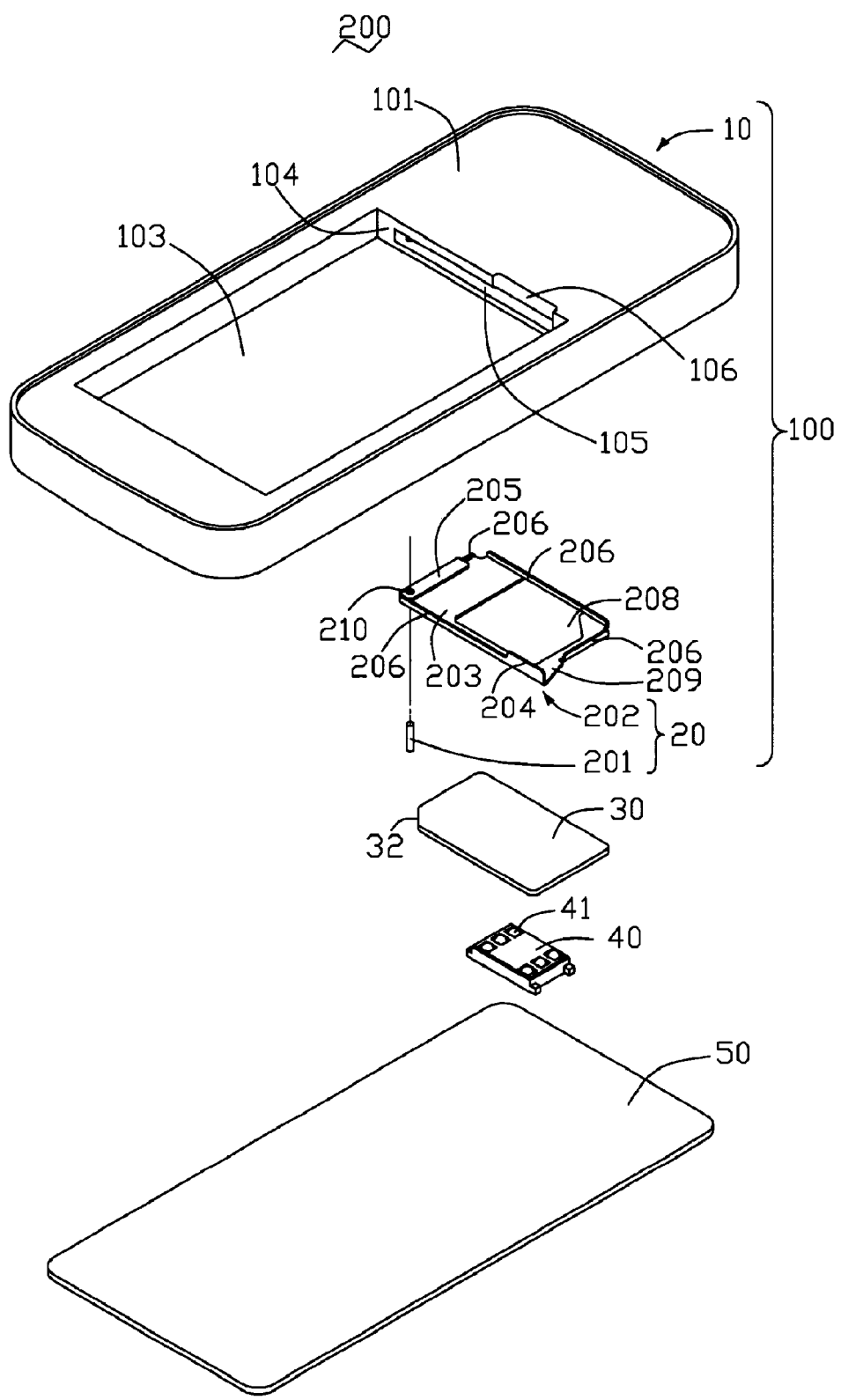
FIG. 1 is an exploded, isometric view of a surface contact card holder with a surface contact card in accordance with a preferred embodiment.
Figure 2:
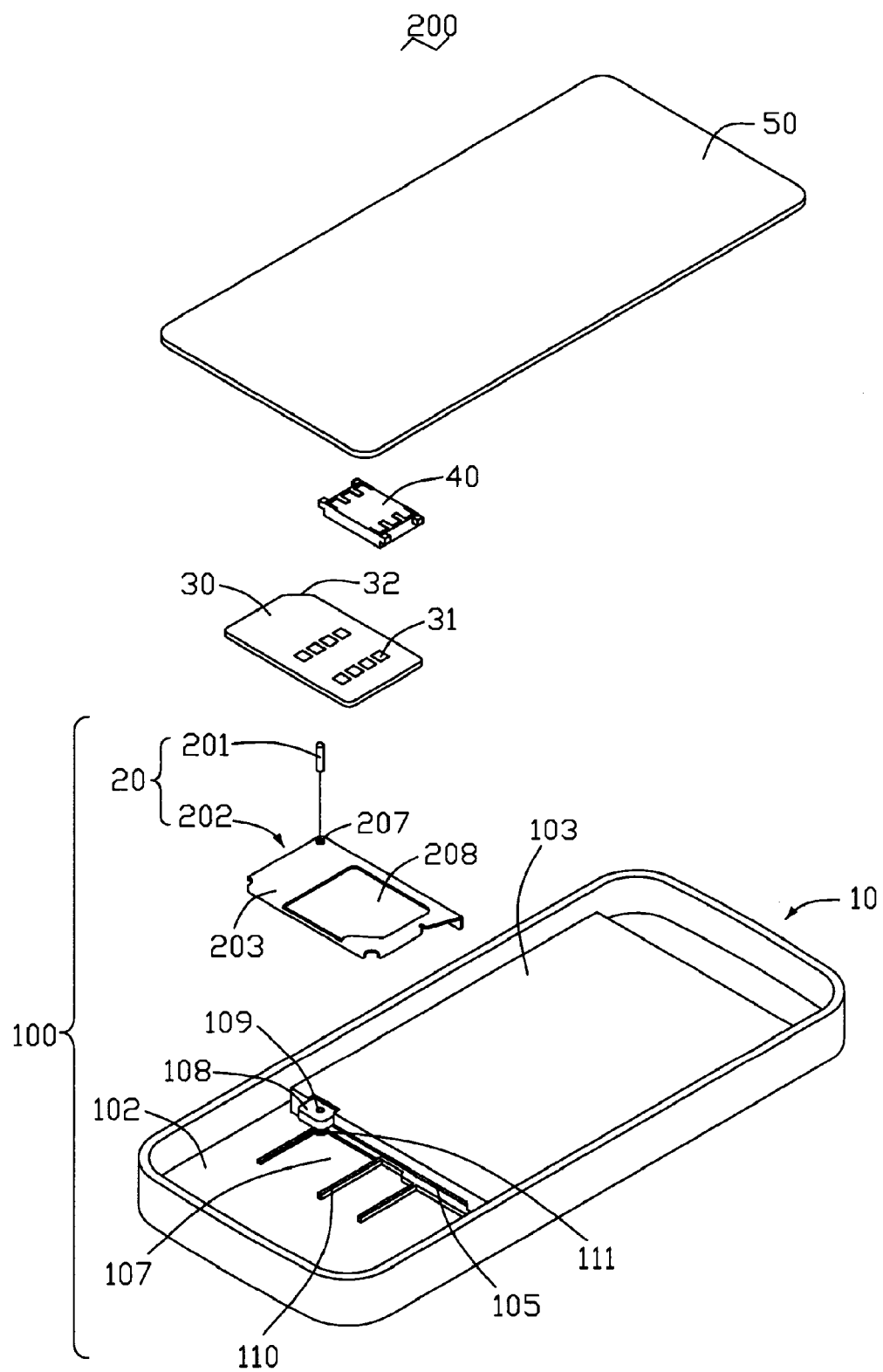
FIG. 2 is similar to FIG. 1 but viewed from another aspect.

Referring now to the drawings in detail, FIGS. 1 and 2 show a surface contact card holder 100 for a SIM card 30 incorporated in a mobile phone/portable electronic device 200. The mobile phone 200 includes the surface contact card holder 100, the SIM card 30, a connector 40 and an electrical board 50. The surface contact card holder 100 includes a main body 10 and a latch structure 20. The mobile phone 200 and the SIM card 30 are taken here as an exemplary application for the purposes of describing details of the surface contact card holder 100 of the preferred embodiment.

The main body 10 is substantially rectangular with a first surface 101 and an opposite second surface 102. The main body 10 defines a receiving cavity 103. One side of the receiving cavity 103 is coplanar with the first surface 101, the other side of the receiving cavity 103 is spaced apart from the second surface 102. The receiving cavity 103 defined cooperatively by a peripheral wall and a bottom portion is used for receiving a battery (not shown). The peripheral wall includes an end portion 104. The end portion 104 defines a receiving groove 105. A cutout 106 is defined at one side of the end portion 104, and is positioned over the receiving groove 105.

The second surface 102 has a latching portion 107 formed adjacent to the receiving cavity 103. The latching portion 107 is substantially a space used for receiving the latch structure 20. The latching portion 107 is communicated by the receiving groove 105 with the opposite side of the main body. The latching portion 107 includes several parallel spaced rails 110. Each rail 110 is oriented perpendicularly to the end portion 104 on the side of the second surface 102. A protrusion 108 is positioned at one end of the end portion 104. The protrusion 108 defines a pivotal hole 109, and is spaced apart from the second surface 102. A bump 111 is formed on the second surface 102 opposite to the protrusion 108. The bump 111 also defines a pivotal hole (not shown). The pivotal hole of the bump 111 is aligned with the pivotal hole 109 of the protrusion 108.

Figure 3:
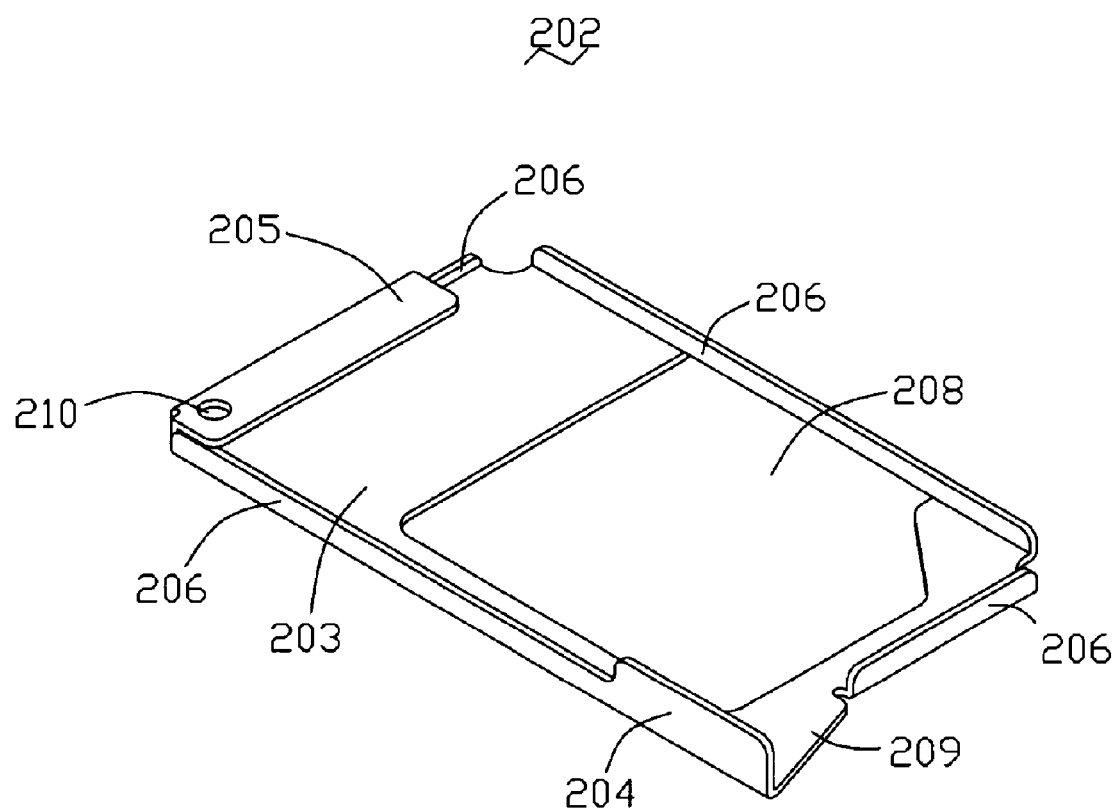
FIG. 3 is an isometric view of the tray shown in FIG. 1.

The latch structure 20 includes a shaft 201 and a tray 202. Referring also to FIG. 3, the tray 202 includes a rectangular bottom wall 203 and four sidewalls 206, cooperatively partially surrounding a space for receiving the SIM card 30. The four sidewalls 206 are not joined at the corners. The bottom wall 203 defines an opening 208 for allowing the SIM card 30 to electrically couple to the electrical board 50. A top edge 205 extends from one of the sidewalls 206, and is bent perpendicularly so as to partially cover the two near sidewalls 206 thereof. The top edge 205 and the wall 203 each define through holes 210 at corners thereof. The shaft 201 may be inserted into the through hole 210. The sidewall 206 interconnected with the top edge 205, has an operating portion 204 extending from one end thereof. The operating portion 204 may be engaged in the cutout 106. The tray 202 has an open end 209 opposite to the top edge 205 to facilitate easy removal of the SIM card 30.

The SIM card 30 is substantially rectangular, and includes a plurality of contact terminals 31 and a slope edge 32. The slope edge 32 is used for accurately securing the SIM card 30. The SIM card 30 may be received in the tray 202, and the contact terminals 31 may show through the opening 208.

The connector 40 has a plurality of electrical terminals 41. The connector 40 may be electrically coupled to the electrical board 50. The electrical board 50 may be received at one side of the second surface 102 of the main body 10. The electrical terminals 41 may be electrically coupled to the contact terminals 31 of the SIM card 30.

Figure 4:
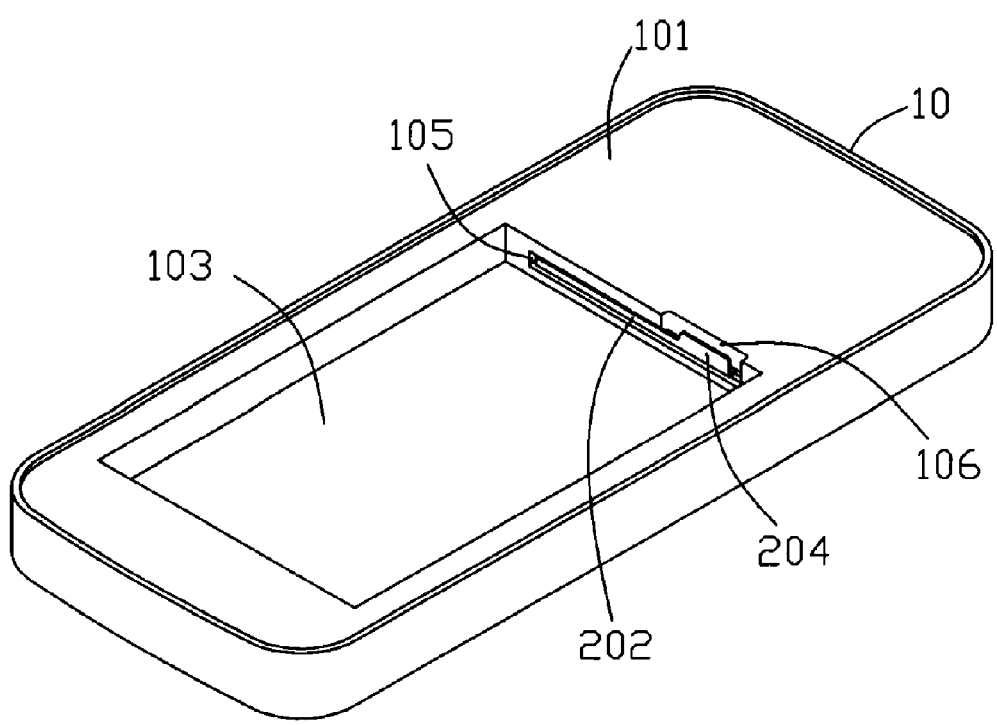
FIG. 4 is an assembled view of the surface contact card holder with the surface contact card shown in FIG. 1.
Figure 5:
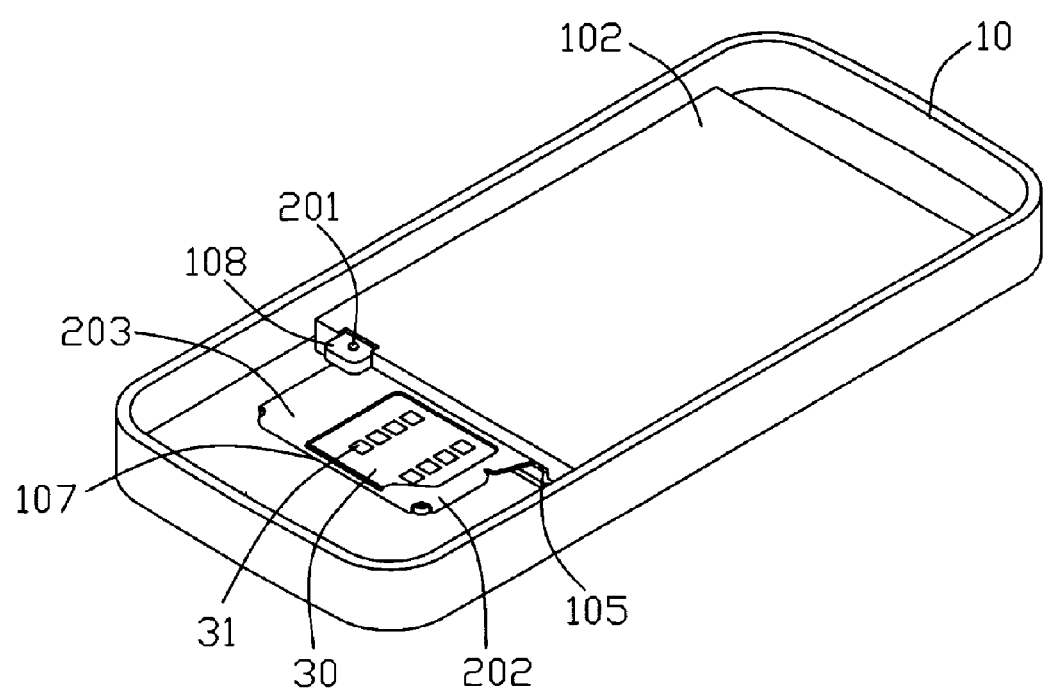
FIG. 5 is similar to FIG. 3, but viewed from another aspect.

During assembly, referring to FIGS. 4 and 5, the tray 202 is inserted into the main body 10 from the receiving groove 105 so that the tray 202 is placed on the latching portion 107. The rails 110 resist the tray 202 and keep the tray 202 spaced from the second surface 206. The operating portion 204 engages in the cutout 106 of the main body 10 so that the tray 202 is limited to move into the receiving groove 105. The through hole 210 is aligned with the pivotal hole 109 of the protrusion 108 and the pivotal hole of the bump 111 of the latching portion 107. Then, the shaft 201 is aligned with the pivotal hole 109 and is inserted into the pivotal hole 109. The shaft 201 is tightly engaged with the pivotal hole 109 of the protrusion 108 and the pivotal hole of the bump 111, and the width of the shaft 201 is less than that of the through hole 210. Therefore, the tray 202 may rotate relative to the shaft 201. Accordingly, the tray 202 is rotatably connected to the main body 10. The connector 40 is electrically fixed on the electrical board 50, and the electrical board 50 is received in the main body 10.

Figure 6:
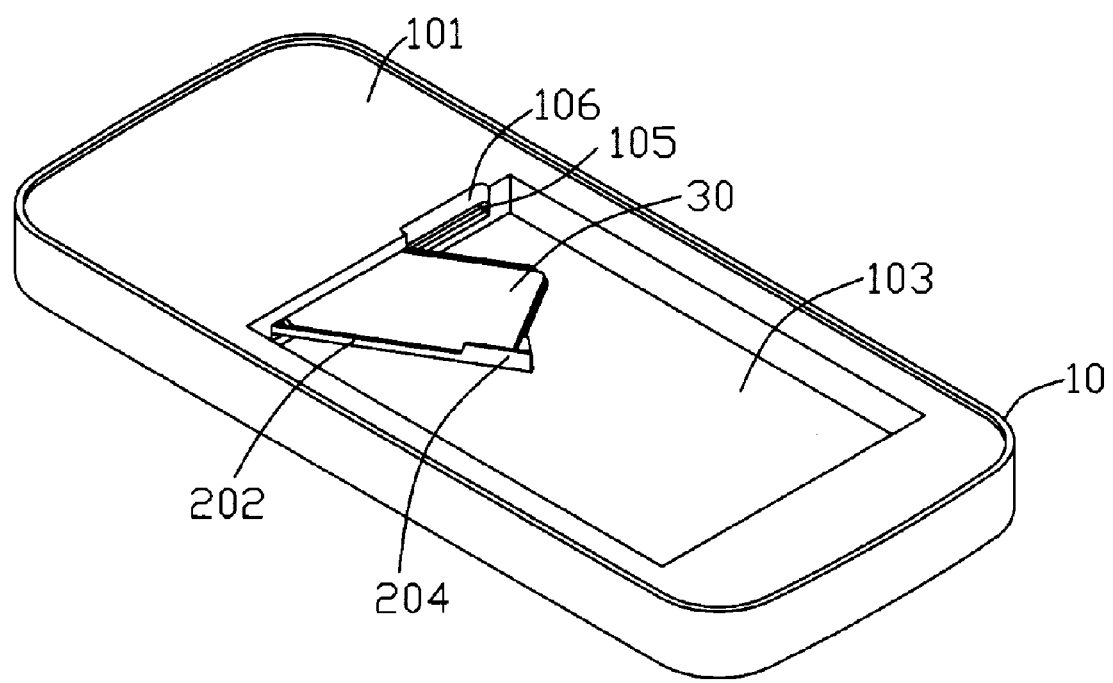
FIG. 6 is a process view of the surface contact card holder with the surface contact card showing the tray rotating out from the receiving groove.
Figure 7:
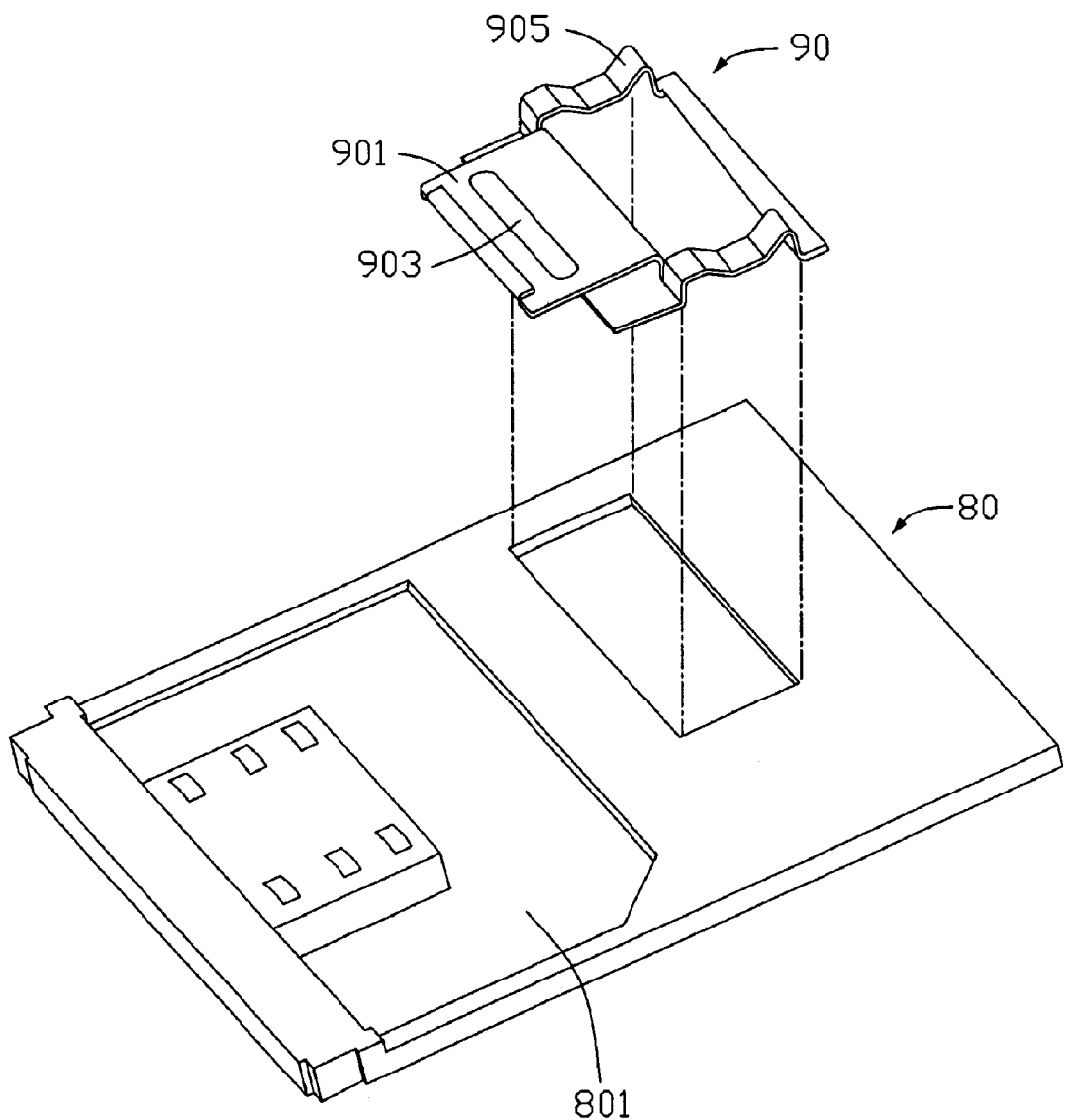
FIG. 7 is an assembled view of a conventional SIM card holder.

In use, referring to FIG. 6, the operating portion 204 of the tray 202 is drawn outwards. Thus, the tray 202 is brought to move away from the latching portion 107, and rotates from the receiving groove 105 until the tray 202 moves out from the entrance of the receiving groove 105. Then, the SIM card 30 is inserted into the tray 202 until the SIM card 30 is entirely received into the tray 202. After that, the tray 202 is pushed reversely so that the tray 202 returns to its original position. The operating portion 205 engages in the cutout 106 again. The battery (not shown) is received in the receiving cavity 103, with the battery abutting the tray 202. The battery can prevent the tray 202 from becoming separated from the main body 10. Thus, the SIM card 30 is held steadily in the main body 10. The contact terminals 31 of the SIM card 30 press against the connector 40 on the electrical board 50 thus maintaining a connection with the electrical board 50.

In alternative embodiments, the receiving groove 105 may be positioned outside of the main body 10. Accordingly, the SIM card 30 may easily be taken out without removing the battery.

In a still further alternative embodiment, the tray 202 disclosed above may be replaced by other structures. Understandably, the tray 202 is rotatably relative to the receiving SIM card groove so as to allow the insertion and removal of the SIM card 30.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A holder for holding a surface contact card, comprising:
a main body of an electronic device;
a receiving cavity formed at a one side of the main body, the receiving cavity being configured for receiving a battery;
a receiving groove formed at the one side of the main body, the receiving groove being adjacent to the receiving cavity;
a latching portion formed at another side of the main body, the receiving groove communicating with the receiving cavity and the latching portion so as to connect the two sides of the main body; and
a latch structure rotatably engaging in the receiving groove and the latching portion, the latch structure being configured for receiving the surface contact card therein.

2. The holder as claimed in claim 1, wherein the latch structure includes a tray and a shaft, the tray receives the surface contact card, the shaft fixes the tray in the main body, and the tray rotates relative to the shaft.

3. The holder as claimed in claim 2, wherein the main body further defines a cutout, the cutout is positioned adjacent to the receiving groove, and the tray forms an operating portion engaging in the cutout.

4. The holder as claimed in claim 2, wherein the receiving cavity is cooperatively defined by a peripheral wall and a bottom portion in the main body, the peripheral wall has an end portion, the receiving groove is defined in the end portion.

5. The holder as claimed in claim 4, wherein the latching portion has a protrusion formed on the end portion, the protrusion defines a pivotal hole, and the tray defines a through hole at a corner, and the shaft passes through the pivotal bole and the through hole of the tray.

6. A portable electronic device comprising:
a device body providing a latching portion and defining a groove, the latching portion connecting with the groove; the device body defining a receiving cavity cooperatively defined by a peripheral wall and a bottom portion, the peripheral wall having an end portion, and the groove defined in the end portion, a receiving element structured and arranged for receiving a surface contact card, the receiving element passing through the groove and positioning on the latching portion; a shaft pivotally connecting the receiving element to the device body in a manner such that the receiving element is allowed to rotate from the groove for insertion and removal of a surface contact card.

7. The portable electronic device as claimed in claim 6, wherein the latching portion is adjacent to the receiving cavity, the groove communicates with the latching portion so as to connect the two sides of the main body.

8. The portable electronic device as claimed in claim 7, wherein the latching portion has a protrusion formed on the end portion, the protrusion define a pivotal hole, and the receiving element defines a through hole at a corner, and the shaft passes through the pivotal hole and the through hole of the receiving element.

9. The portable electronic device as claimed in claim 6, wherein the receiving element includes a tray, the tray receives the surface contact card and can rotate relative to the shaft.

10. The portable electronic device as claimed in claim 9, wherein the main body further defines a cutout, the cutout is positioned adjacent to the groove, the tray forms an operating portion engaging in the cutout.

11. A portable electronic device comprising:
a main body defining a receiving cavity, a receiving groove, and a space, the receiving cavity communicating with the space through the receiving groove so as to connect the two sides of the main body;
a card carrier attached to the main body and pivotable into and out of the receiving groove about a pivot axis perpendicular to the main body, the card carrier being configured for carrying a surface contact card therewith, and the card carrier is inserted into the receiving groove so as to be received in the space.

12. The holder as claimed in claim 2, wherein the latch portion includes a plurality of rails, the rails resist the tray and keep the tray spaced from the main body.

13. The holder as claimed in claim 5, wherein a bump is formed at a corner of the latch portion, the bump defines a pivotal hole, and is aligned with the pivotal hole of the protrusion.

14. The portable electronic device as claimed in claim 6, wherein the latch portion includes a plurality of rails, the rails resist the card carrier and keep the card carrier spaced from the main body.

15. The portable electronic device as claimed in claim 11, wherein a plurality of rails are positioned under the space, the rails resist the tray and keep the tray spaced from the main body.

* * * * *